(12) United States Patent
Manteiga et al.

(10) Patent No.: US 6,330,985 B1
(45) Date of Patent: Dec. 18, 2001

(54) LINK COMPONENT FOR AIRCRAFT ENGINE MOUNTING SYSTEMS

(75) Inventors: John Alan Manteiga, North Andover, MA (US); Cornelius Harm Dykhuizen; Thomas Peter Joseph, both of West Chester, OH (US); Christopher James Wilusz, Peabody, MA (US); Robert Eugene Troup, Hamilton; Ethan Boger, Cincinnati, both of OH (US); Anthony John Franceschelli, Beverly, MA (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/608,480

(22) Filed: Jun. 30, 2000

(51) Int. Cl.$^7$ .................................................. B64D 27/00
(52) U.S. Cl. ............................ 244/54; 248/554; 60/39.31
(58) Field of Search .................................... 244/53 R, 54; 60/39.31; 128/378–379; 248/554

(56) References Cited

U.S. PATENT DOCUMENTS

| 4,603,821 | * | 8/1986 | White | 244/54 |
| 5,244,170 | * | 9/1993 | Shekher | 244/54 |
| 5,782,430 | * | 7/1998 | Mouille | 244/54 |
| 5,845,236 | * | 12/1998 | Jolly et al. | 244/550 |
| 6,212,974 | * | 4/2001 | Van Duyn | 244/54 |

* cited by examiner

Primary Examiner—Galen L. Barefoot
(74) Attorney, Agent, or Firm—Andrew C. Hess; Nathan D. Herkamp

(57) ABSTRACT

A link for use in an aircraft engine mounting system includes a span section having a first connector formed (at one end thereof and a second connector formed at another end thereof. A lumped mass is disposed on the span section for placing the resonant frequency of the link away from engine excitation frequencies.

17 Claims, 3 Drawing Sheets

US 6,330,985 B1

LINK COMPONENT FOR AIRCRAFT ENGINE MOUNTING SYSTEMS

BACKGROUND OF THE INVENTION

This invention, relates generally to aircraft engines and more particularly to mounts for supporting an engine on an aircraft.

An aircraft engine may be mounted to an aircraft at various locations such as the wings, fuselage or tail. The engine is typically mounted at both its forward and aft ends by corresponding forward and aft mounts for carrying various loads to the aircraft. The loads typically include vertical loads such as the weight of the engine itself, axial loads due to the thrust generated by the engine, lateral loads such as those due to wind buffeting, and roll loads or moments due to rotary operation of the engine. The mounts must also accommodate both axial and radial thermal expansion and contraction of the engine relative to the supporting structure.

Engine mounts typically comprise a mounting frame that is fixedly secured to aircraft structure, such as a pylon, and a number of links that connect the engine to the mounting frame. In some applications, connecting links are required to be relatively long and slender components.

Long and slender mounting system components can have low order resonant frequencies that coincide with or are in close proximity to engine excitation frequencies, such as those caused by engine 1/rev operating speeds. These modes can be driven by inherent vibration caused by rotational unbalance in the low pressure or high pressure rotors of the engine. Because mounting systems tend to be lightly damped, high amplitude vibratory response is likely. High amplitude vibratory response can result in mount component high cycle fatigue, joint wear and/or repetitive impact damage.

Engine manufacturers typically rely on seeded unbalance testing to detect resonant frequency issues. Unfortunately, high engine unbalance events, such as rotor bladeout, cannot be practically tested because of the difficulty of producing high unbalance operation for a sufficient time to collect frequency data. This makes fielding a mounting system having tolerance to high engine unbalance a challenging task.

Currently, mounting systems are designed with component resonant frequencies that are not in proximity to engine excitation frequencies. This is typically accomplished by decreasing the length-to-diameter ratio of the link component in order to raise link flexure resonant frequencies sufficiently away from engine excitation frequencies to minimize the vibratory response. However, obtaining smaller length-to-diameter ratios generally results in larger volume mount links because the length of the links is often set by other design requirements. Larger volume links increase the overall weight of the mounting system and adversely affect packaging issues in a system where each part is usually allotted only a limited amount of space. Another possible approach is to accept the resonant link and design the links for high cycle fatigue endurance. This approach can be very difficult for new designs because link response to engine excitation is seldom known when the links are designed.

Accordingly, it would be desirable to have a link component for engine mounting systems that is designed with resonant frequencies that are not in proximity current links.

BRIEF SUMMARY OF THE INVENTION

The above-mentioned need is met by the present invention that provides a link for an engine mounting system. The link comprises a span section having a first connector formed at one end thereof and a second connector formed at another end thereof. A lumped mass is disposed on the span section for placing the resonant frequency of the link away from engine excitation frequencies.

The present invention and its advantages over the prior art will become apparent upon reading the following detailed description and the appended claims with reference to the accompanying drawings.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
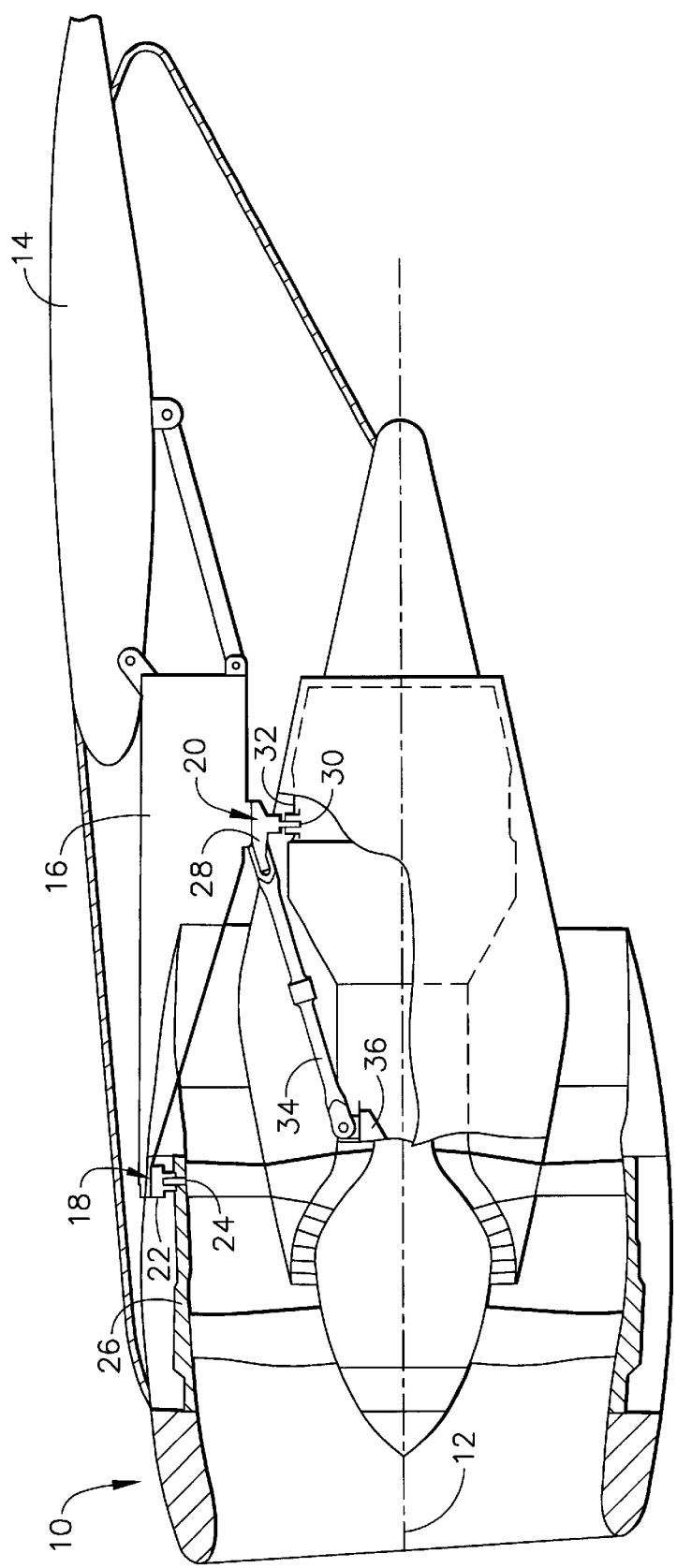
FIG. 1 is a side view of an aircraft engine having a mounting system component of the present invention.

Referring to the drawings wherein identical reference numerals denote the same elements throughout the various views, FIG. 1 an exemplary turbofan gas turbine engine 10 having a longitudinal or axial centerline axis 12 mounted below an aircraft wing 14. The vying 14 includes a pylon 16, and the engine 10 is mounted to the pylon 16 by a mounting system comprising a forward mount 18 and an aft mount 20 spaced axially downstream from the forward mount 18. Although the engine 10 is shown as being mounted in a top mounted installation, this is only for purposes of illustration. It will be understood from the following description that the present invention is equally applicable to mounting system components that are used in any type of engine installation, including side mounted and bottom mounted installations. Accordingly, the present invention is not limited to wing-mounted engines, but can also be used with fuselage and tail-mounted engines. Furthermore, the present invention is not limited to turbofan engines, but can be used with other types of engines such as turboshaft and turboprop engines.

The forward mount 18 includes a mounting frame 22 that is fixedly joined to the pylon 16 by conventional means such as bolts. The forward mounting frame 22 is joined to the engine 10 by one or more links 24, wherein each link 24 is joined at one end to the forward mounting frame 22 and at the other end to the engine's fan casing 26. The aft mount 20 includes a mounting frame 28 that is also fixedly joined to the pylon 16 by conventional means such as bolts. One or more links 30 are used to join the engine 10 to the aft mounting frame 28. Specifically, each link 30 is joined at one end to the aft mounting frame 28 and is joined at the other end to the engine's core engine casing 32 or some other stationary engine structure. Engine vertical, lateral and roll loads are thus reacted through the forward and aft mounting links 24 and 30. The aft mount 20 further includes at least one thrust link 34 for reacting thrust generated by the engine 10. The thrust link 34 is joined at one end to the aft mounting frame 28 and is joined at the other end to stationary engine structure such as the engine's front frame 36.

Figure 2:
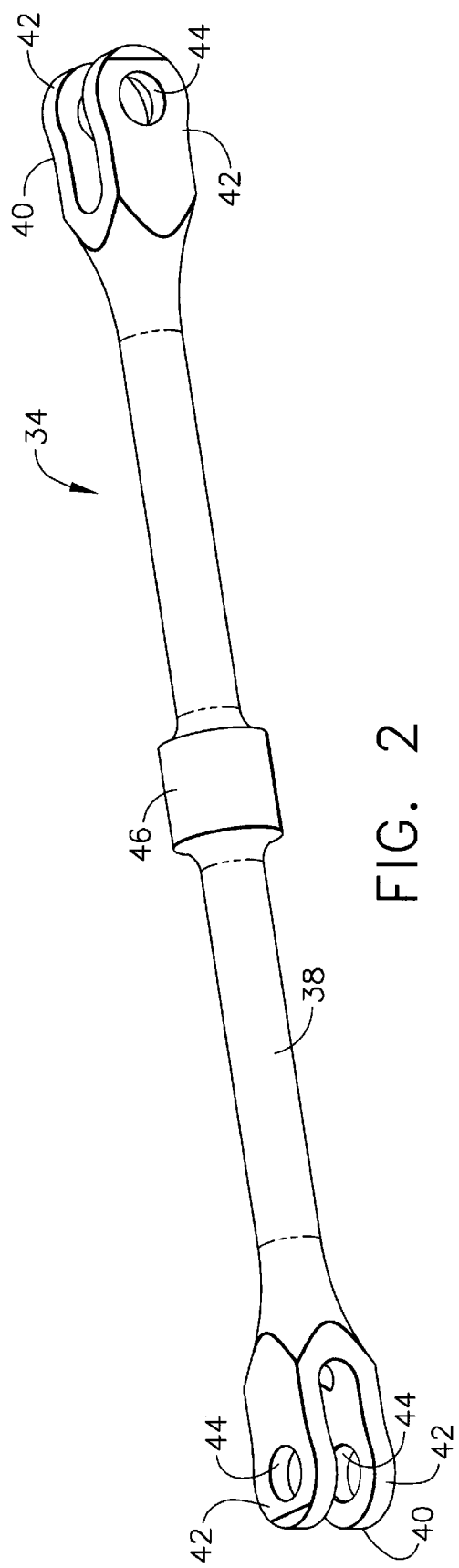
FIG. 2 is an isometric view of a link from the mounting system of FIG. 1.
Figure 3:
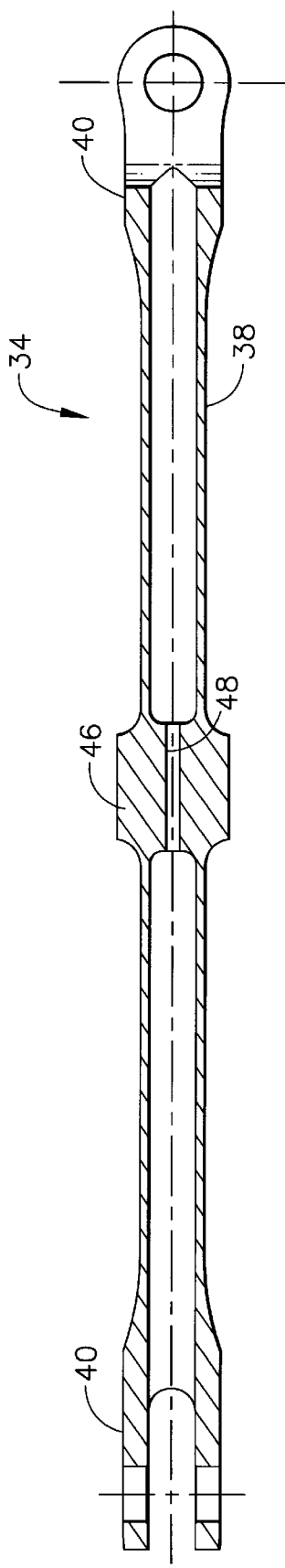
FIG. 3 is a longitudinal cross-sectional view of the link of FIG. 2.

Referring now to FIGS. 2 and 3, the thrust link 34 is shown in more detail. Although the concept of the present invention is described herein as applied to the thrust link, it should be noted that the present invention is not limited to thrust links. Indeed, the present invention, which can be applied to a number of mounting system components, is useful in any component that is sufficiently long and slender that its resonant frequency would normally be in proximity to engine excitation frequencies.

The thrust link 34 includes an elongated span section 38, where each end of the span section 38 has a connector 40 formed thereon. As shown in FIG. 2, each connector 40 is in the form of a clevis having a pair of axially extending, parallel arms 42, with each arm 42 having a hole 44 formed therein. The connectors 40 can thus be joined to other mounting structure by a bolt or pin (not shown) passing through both holes 44 and an aperture formed in the other mounting structure. While the connectors 40 are shown as being clevises, it should be noted that they could be any type connecting structure capable of joining the ends of the thrust link 34 to the appropriate structure of the mounting system.

The span section 38 has an enlarged section or lumped mass 46 integrally formed thereon for placing the resonant frequency of the thrust link 34 sufficiently away from engine excitation frequencies so as to minimize its vibratory response. This is referred to herein as the "frequency placement" of the thrust link 34. The presence of the lumped mass 46 changes the link's stiffness and mass ratio and thereby alters the resonant frequency of the thrust link 34 from what it would be with a span section having a uniform cross-section. This will thus minimize or eliminate excitation by the engine 10. Specifically, the weight and positioning of the it mass 46 is selected to reduce the link resonant frequency to a value that is between the engine fan rotor maximum speed and the engine core rotor minimum speed.

The weight and positioning of the lumped mass 46 will be determined by analysis of the overall system and will depend on the particular application, based on a number of factors such as the length of the thrust link 34. The lumped mass 46 will generally be located on the span section 38 somewhere between the two connectors 40. Preferably, but not necessarily, the lumped mass 46 is located at a vibration mode antinode of the thrust link 34 because the lumped mass 46 will generally be more effective at such a location. The weight and positioning of the lumped mass 46 will be selected to achieve the desired frequency placement while having the smallest possible impact on weight and strength of the thrust link 34.

As best seen in FIG. 3, the thrust link 34 is hollow, although the present invention is also applicable to solid links. A hollow link will reduce the overall weight of the mounting system, and hollow profiles are generally more resistant to buckling. With the hollow link, the lumped mass 46 is provided with a drain hole 48 extending axially therethrough to fluidly connect the two hollow portions of the thrust link 34. This prevents trapping of fluids inside the thrust link 34.

Figures 4, 5:
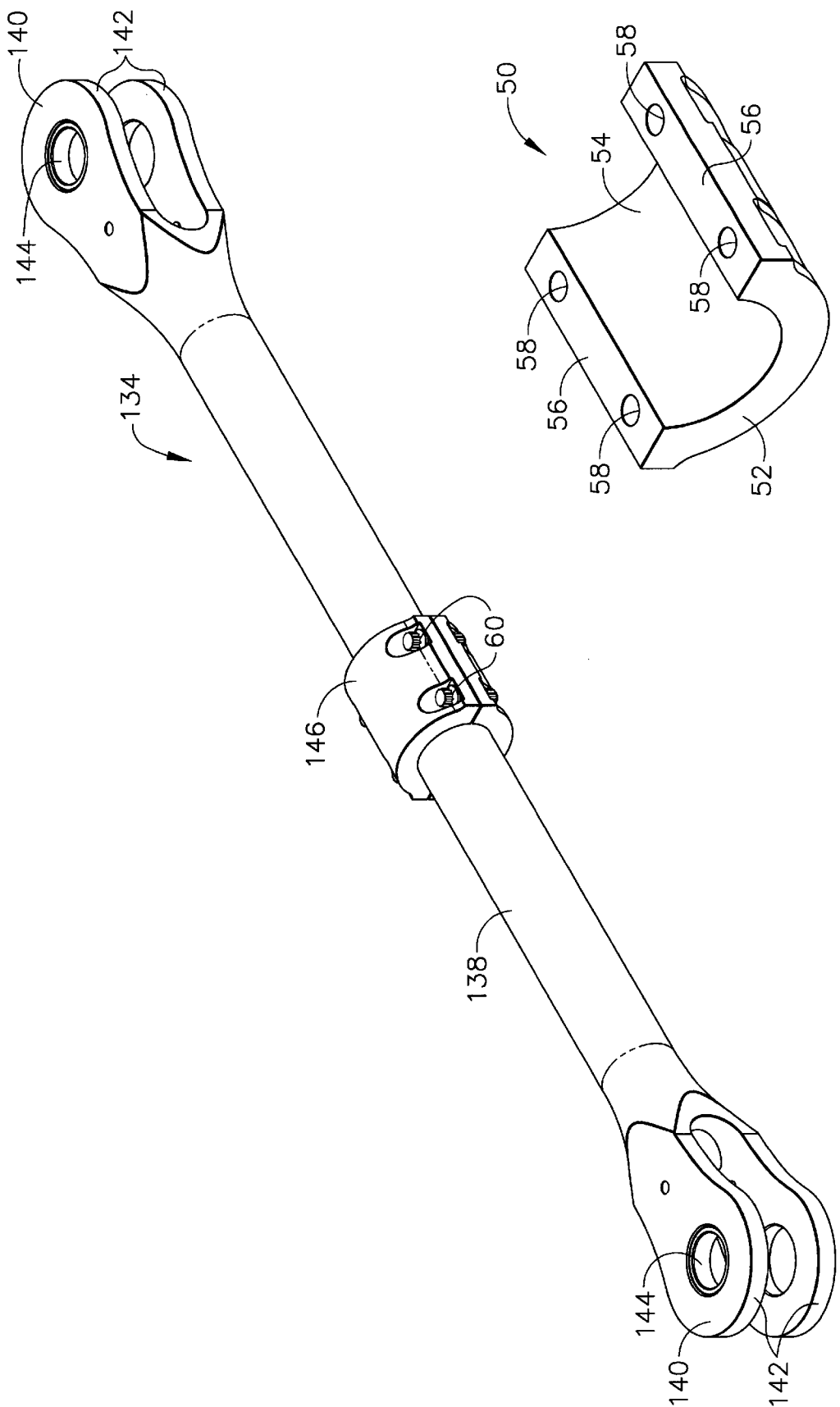
FIG. 4 is an isometric view of an alternative embodiment of a mounting system link.
FIG. 5 is a perspective view of a lumped mass segment from the link of FIG. 4.

Turning now to FIG. 4, a second embodiment of the invention is shown. Here, a thrust link 134 includes an elongated span section 138, where each end of the span section 138 has a connector 140 formed thereon. As in the first embodiment, each connector 140 is in the form of a clevis having a pair of axially extending, parallel arms 142, with each arm 142 having a hole 144 formed therein. The connectors 140 can thus be joined to other mounting structure by a bolt or pin . (not shown) passing through both holes 144 and an aperture formed in the other mounting structure. While the connectors 140 are shown as being clevises, it should be noted that they could be any type connecting structure capable of joining the ends of the thrust link 134 to the appropriate structure of the mounting system.

A lumped mass 146 in the form of a separate weight is attached to the span section 138 for placing the resonant frequency of the thrust link 134 away from engine excitation frequencies. The lumped mass 146 comprises two halves or segments 50, one of which is shown in FIG. 5. For round links, each segment 50 has a generally U-shaped body 52 that defines a concave surface 54. A mounting flange 56 extends perpendicularly outward from each end of the segment body 52. Two holes 58 are formed in each mounting flange 56 to receive appropriate fasteners 60 (FIG. 4).

The lumped mass 146 is thus attached to the thrust link 134 by locating the two segments 50 on diametrically opposed sides of the span section 138 with the corresponding mounting flanges being axially aligned. The concave surfaces 54 are sized to fit over span section 138 so as to leave a gap between each pair of mounting flanges 56. The two segments 50 are then secured together using the fasteners 60. Tightening the fasteners 60, which can be any conventional fastener such as nuts and bolts, closes the gaps so as to create an interference fit that securely clamps the lumped mass 146 in position on the thrust link 134. It should be noted that other modes of attaching the lumped mass 146 to the thrust link 134 are possible.

The segments 50 can be made of any material having sufficient strength and corrosion resistance. Typically, this will be a material that has a density that is equal to or greater than the material that the thrust link 134 is made out of The segment material should also resist galvanic coupling with the link material.

The separate lumped mass 146 functions in generally the same manner as the integral lumped mass of the first embodiment. That is, the presence of the lumped mass 146 shifts the resonant frequency of the thrust link 134 sufficiently away from engine excitation frequencies so as to minimize its vibratory, response. As with the first embodiment described above, the weight and positioning of the lumped mass 146 is selected to reduce the link resonant frequency to a value that is between the engine fan rotor maximum speed and the engine core rotor minimum speed, and to do so so in a weight efficient manner.

The foregoing has described a link component for engine mounting systems having resonant frequencies that are not in proximity to engine excitation frequencies. In practice, the use of a lumped mass for frequency placement in engine mounting systems permits greater flexibility in overall system design. Relatively long and slender link components can be used with lumped masses as required to effectively .place component resonant frequencies away from engine excitation frequencies in a weight efficient manner. Existing link components having poorly placed resonant frequencies can be retrofit with attached lump masses to correct the response frequencies.

Another desirable characteristic of the present invention is that resonant frequencies can be "tuned" with an attached lumped mass. This is useful because analytical frequency predictions are sensitive to boundary conditions, which are often difficult to predict. Thus, a preliminary analysis can be used to estimate frequencies based on an initial weight and location of the lumped mass. This can be followed by testing of the preliminary analysis and then changing the weight and/or location of the attached lumped weight to "fine tune" resonant frequencies.

The combination of lumped mass weight and positioning allows the designer the flexibility to reposition undesirable resonant modes with little effect on other acceptably placed modes. This is accomplished by positioning the lumped mass at or between vibration mode antinodes. This approach is desirable, as repositioning one mode resonant frequency without changing others is often required to keep all modes away from engine excitation frequencies.

While specific embodiments of the present invention have been described, it will be apparent to those skilled in the art that various modifications thereto can be made without departing from the spirit and scope of the invention as defined in the appended claims.

What is claimed is:

1. In a mounting system for mounting an engine to an aircraft, a link comprising:
   a span section;
   a first connector formed at one end of said span section;
   a second connector formed at another end of said span section; and
   means for placing resonant frequencies of said link away from excitation frequencies of said engine.

2. The link of claim 1 wherein said means for placing resonant frequencies of said link comprises a lumped mass disposed on said span section.

3. The link of claim 2 wherein said lumped mass is located on a vibration mode antinode of said link.

4. The link of claim 2 wherein said lumped mass is integrally formed on said span section.

5. The link of claim 4 wherein said lumped mass has a drain hole formed therein.

6. The link of claim 2 wherein said lumped mass is a separate weight that is attached to said span section.

7. The link of claim 6 wherein said weight comprises first and second segments that are located on diametrically opposing sides of said span section.

8. The link of claim 7 wherein each one of said segments has a U-shaped body with two mounting flanges formed thereon.

9. The link of claim 6 wherein said weight is made of a material that is at least as dense as the material that said span section is made of.

10. A link for an engine mounting system, said link comprising
    a span section;
    a first connector formed at one end of said span section;
    a second connector formed at another end of said, span section; and
    a lumped mass disposed on said span section.

11. The link of claim 10 wherein said lumped mass is located on a vibration mode antinode of said span section.

12. The link of claim 10 wherein said lumped mass is integrally formed on said span section.

13. The link of claim 12 wherein said lumped mass has a drain hole formed therein.

14. The link of claim 10 wherein said lumped mass is a separate weight that is attached to said span section.

15. The link of claim 14 wherein said weight comprises first and second segments that are located on diametrically opposing sides of said span section.

16. The link of claim 15 wherein each one of said segments has a U-shaped body with two mounting flanges formed thereon.

17. The link of claim 14 wherein said weight is made of a material that is at least as dense as the material that said span section is made of.

* * * * *